United States Patent [19]

Chan

[11] Patent Number: 4,591,118

[45] Date of Patent: May 27, 1986

[54] HYSTERESIS CONDITIONER FOR SPACECRAFT ATTITUDE CONTROL

[75] Inventor: Fred N. Chan, Atherton, Calif.

[73] Assignee: Ford Aerospace & Communications Corporation, Detroit, Mich.

[21] Appl. No.: 619,169

[22] PCT Filed: Feb. 17, 1984

[86] PCT No.: PCT/US84/00238

§ 371 Date: Feb. 17, 1984

§ 102(e) Date: Feb. 17, 1984

[87] PCT Pub. No.: WO85/03686

PCT Pub. Date: Aug. 29, 1985

[51] Int. Cl.$^4$ .............................................. B64G 1/36
[52] U.S. Cl. ..................................... 244/171; 244/164
[58] Field of Search ............... 244/164, 165, 166, 167, 244/168, 169, 170, 171, 176; 364/431.07, 432, 434

[56] References Cited

U.S. PATENT DOCUMENTS

| | | | |
|---|---|---|---|
| 3,636,411 | 1/1972 | Bulloch | 244/176 |
| 3,749,914 | 7/1973 | Terasaki | 250/83.3 H |
| 3,834,653 | 9/1974 | Perkel | 244/166 |
| 3,984,071 | 10/1976 | Fleming | 244/169 |
| 4,114,841 | 9/1978 | Muhlfelder et al. | 244/166 |
| 4,114,842 | 9/1978 | Hofferber et al. | 244/180 |
| 4,174,819 | 11/1979 | Bruderle et al. | 244/169 |
| 4,288,051 | 9/1981 | Göschel | 244/164 |
| 4,358,076 | 11/1982 | Lange et al. | 244/164 |
| 4,386,750 | 6/1983 | Hoffman | 244/170 |
| 4,424,948 | 1/1984 | Muhlfelder et al. | 244/170 |
| 4,437,047 | 3/1984 | Smay | 244/164 |

Primary Examiner—Galen L. Barefoot
Assistant Examiner—Rodney Corl
Attorney, Agent, or Firm—Edward J. Radlo; Keith L. Zerschling

[57] ABSTRACT

Apparatus for enhancing the stability of a spacecraft (2) about a sensing axis (4). The spacecraft (2) may be of the three axis stabilized or spin stabilized variety. An attitude sensor (3) determines the offset angle (A) formed between a face (8) of the spacecraft (2) and an astronomical body (6), such as the earth. The sensor (3) produces an attitude signal (14) which is processed by compensation electronics (21) and fed to a torquing means (25) to close the angle (A) to within a desired preselected deadband (24). The attitude signal (14) is hysteresis conditioned to (1) suppress saturated portions (18, 20) of the signal (14) having opposite polarity with respect to spacecraft (2) angular velocity, to avoid unwanted spacecraft (2) spinup; (2) allow passage to the compensation electronics (21) of saturated portions (18, 20) of the signal (14) having the same polarity with respect to the angular velocity of the spacecraft (2), to damp the spacecraft (2) velocity; and (3) suppress the signal (14) when the sensor (3) is not detecting the body (6), in order to limit the velocity of the spacecraft (2).

10 Claims, 8 Drawing Figures

HYSTERESIS CONDITIONER FOR SPACECRAFT ATTITUDE CONTROL

TECHNICAL FIELD

This invention pertains to the field of stabilizing the attitude of a spacecraft with respect to an astronomical body, e.g., the earth. The spacecraft to be stabilized may be a three-axis stabilized spacecraft or the despun platform of a spin-stabilized space vehicle.

BACKGROUND ART

U.S. Pat. No. 4,114,841 discloses a method for stabilizing an orbiting satellite utilizing magnetic torquing. The magnetic torque can be developed to change the spin rate of the orbiting satellite only when the earth's presence is detected. This superficially appears to be related to that aspect of the present invention in which the signal 14 produced by attitude sensor 3 is clamped to within the astronomical body detection domain 26 in order to limit the spin velocity of spacecraft 2. However, the cited reference pertains to reducing the spin rate of a spin-stabilized satellite about its spin axis. On the other hand, when the present invention is used with a spin stabilized space vehicle, it is to make stationary the despun portion of the space vehicle with respect to an astronomical body such as the earth, and does not relate to the spinning portion of the space vehicle. Furthermore, the cited reference does not use hysteresis as in the present invention.

Similarly, U.S. Pat. No. 3,749,914 pertains to aligning the spin axis of a spin-stabilized space vehicle with respect to an external reference. As stated above, the present invention, in the embodiment in which it is used for a spin-stabilized space vehicle, operates on the despun portion of the space vehicle, not on the spinning portion.

U.S. Pat. Nos. 4,288,051 and 4,358,076 disclose techniques for acquiring the sun and earth from the vantage point of a spacecraft, which techniques could be used by attitude sensor 3 of the present invention.

U.S. Pat. No. 3,834,653 shows a type of torque controller which could be used as torquing means 25 of the present invention. Also note earth time detectors 42 and 44.

U.S. Pat. No. 4,114,842 is a system for recapturing the altitude (not attitude) of an aircraft; it is not a system for stabilizing the attitude of a spacecraft with respect to an astronomical body as in the present invention.

DISCLOSURE OF INVENTION

The present invention is an apparatus for stabilizing the attitude of a spacecraft (2) with respect to an astronomical body (6). On board the spacecraft (2) is an attitude sensor (3) which senses the attitude error angle (A) taken about a sensing axis (4) that is orthogonal to the attitude error angle (A). The error angle (A) is defined as the angle formed between a line (10) fixedly associated with the spacecraft (2) and a line (12) connecting the spacecraft (2) with the centroid of the astronomical body (6). The output attitude signal (14) from the attitude sensor (3) is processed to optimize the spacecraft (2) control loop phase margin, damping, and stability. This is accomplished by:

1. Introducing hysteresis into the attitude signal (14) so that only the velocity informative portion (16) of the signal (14) is presented to the compensation electronics (21), if the most recent history of the error angle (A) indicates that said angle (A) has been outside the detection domain (26) within which the sensor (3) is capable of detecting the presence of the body (3). This eliminates the presentation of that saturated portion (18 or 20) of the attitude signal (14) which has opposite polarity with respect to the velocity of the spacecraft (2) about the sensing axis (4), and therefore avoids unnecessary and unwanted acceleration of the spacecraft (2) about the sensing axis (4).

2. If the most recent history of the error angle (A) indicates that said angle (A) has just left the velocity informative portion (16), hysteresis is provided to inhibit presentation of the attitude signal (14) to the compensation electronics (21) only when the error angle (A) passes out of the detection domain (26). This allows passage of the saturated portion (18 or 20) of the attitude signal (14) having the same polarity with respect to the velocity of the spacecraft (2) about the sensing axis (4), thus desirably dampening the spacecraft (2) velocity about this axis (4).

3. The attitude signal (14) is prevented from being introduced to the compensation electronics (21) when the sensed error angle (A) is outside of the detection domain (26). This desirably limits the velocity of the spacecraft (2) about the sensing axis (4), and suppresses information which is ipso facto velocity noninformative.

The foregoing hysteresis conditioning is accomplished by an absolute value circuit (7), a threshold detector (9), a flip-flop (15), and three logic gates (11, 13, and 17). Alternatively, it is accomplished by a computer program.

BRIEF DESCRIPTION OF THE DRAWINGS

These and other more detailed and specific objects and features of the present invention are more fully disclosed in the following specification, reference being had to the accompanying drawings, in which.

BEST MODE FOR CARRYING OUT THE INVENTION

Figure 1:
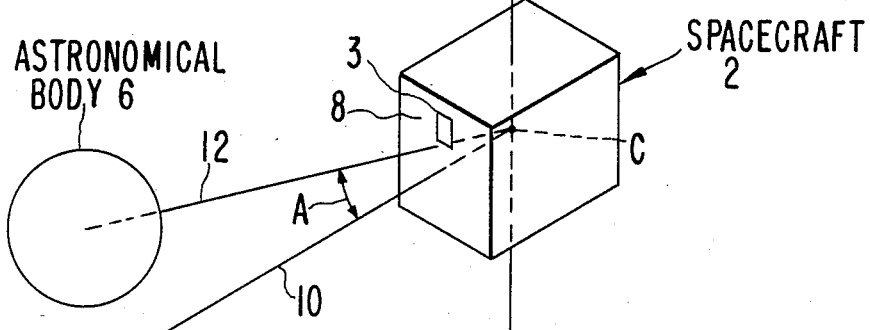
FIG. 1 is a sketch of a spacecraft 2 to be stabilized using the present invention.

FIG. 1 shows a typical spacecraft 2 to be stabilized by the present invention. Spacecraft 2 may be in transfer orbit, geosynchronous orbit, or escape trajectory. Sensor 3 is mounted on one face 8 of spacecraft 2 and disposed to view astronomical body 6, which is usually the earth or the sun but may be some other body. The invention will be described with respect to stabilization of spacecraft 2 about sensing axis 4, an axis passing through the center of mass C of spacecraft 2. In the case where spacecraft 2 is a three axis stabilized spacecraft, sensing axis 4 is usually one of the three axes of stabilization. The present invention may be utilized for stabilization about a second axis orthogonal to sensing axis 4 by duplicating the requisite hardware or software for the second axis. For example, a first set of hardware may be utilized to stabilize spacecraft 2 about its pitch axis and a second set of hardware used to stabilize spacecraft 2 about its roll axis. Other means are then provided for stabilization about the yaw axis. Similarly, three sets of identical hardware or software, each incorporating the present invention, can be used to stabilize spacecraft 2 about all three axes.

In the case where spacecraft 2 is the despun portion of a spin stabilized space vehicle, the spin portion (not illustrated) may have its spin axis oriented by a conventional technique, e.g., that illustrated in U.S. Pat. No. 3,749,914. Then the despun portion 2 needs to be stabilized about just one axis 4, and just one set of hardware or software incorporating the present invention is required.

Figure 2:
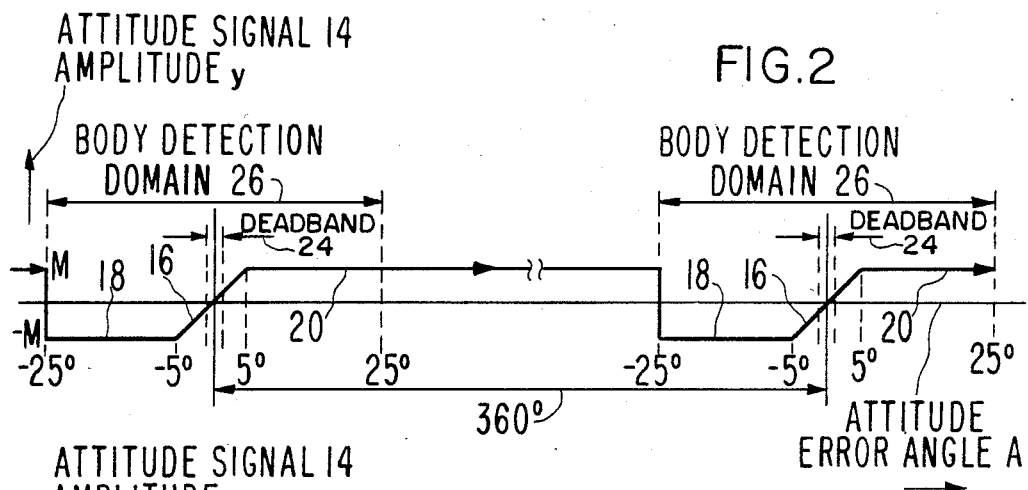
FIG. 2 shows a typical attitude signal 14 produced by a conventional attitude sensor 3, for positive rotations of spacecraft 2 about sensing axis 4.
Figure 3:
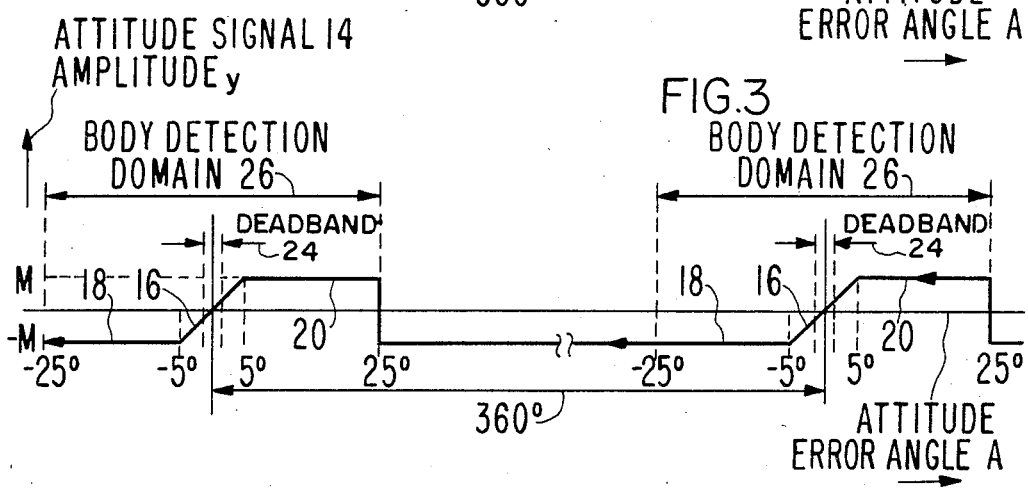
FIG. 3 shows a typical signal 14 produced by a conventional attitude sensor 3, for negative rotations of spacecraft 2 about sensing axis 4.

Sensor 3 typically utilizes an oscillating mirror or imaging means, and produces an output attitude signal 14 whose amplitude y is a function of attitude error angle A, as illustrated in FIGS. 2 and 3. Angle A is, by definition, that angle formed between line 12 (connecting the centroid of body 6 with the center of mass C) and line 10 (any line fixedly positioned with respect to spacecraft 2). Line 10 is herein illustrated as passing through the center of mass C and orthogonal to face 8. Each of lines 12 and 10 is orthogonal to sensing axis 4. Therefore, angle A is orthogonal to sensing axis 4, and one may say that angle A is "taken about" axis 4 or "measured with respect to" axis 4.

The signals 14 illustrated in FIGS. 2 and 3 are representative output signals produced by attitude sensor 3, and, in this case, are actual data obtained using commercially available 3-axis earth sensors manufactured by Lockheed Missiles & Space Company, Inc., Sunnyvale, Calif. FIGS. 2 and 3 illustrate amplitude y versus angle A for the pitch axis. The data is valid for angular offsets about the roll axis of up to $+14°$. FIG. 2 represents positive rotation about axis 4, as illustrated by the arrows superimposed on the lines representing signal 14. Positive rotation means that angle A (whose sign has been arbitrarily pre-defined) is increasing. Similarly, FIG. 3 represents negative rotation of spacecraft 2 about axis 4, as illustrated.

It is seen that these particular sensors 3 have been designed so that they are capable of detecting the presence of body 6, in this case the earth, across a 50° domain of angle A. This domain is called the body detection domain 26. Within domain 26 are three distinct regions. The first region is a horizontal region 18, having negative amplitude. Region 16 is a sloping region, having slope S. Here, S is scaled to 1. Region 20 is a horizontal region having a positive amplitude. Regions 18 and 20 are said to be saturated regions because signal 14 is saturated here. Region 16 is the only region in which spacecraft 2 angular velocity information can be provided to compensation electronics 21. Thus, region 16 is sometimes referred to as the velocity-informative region. Region 16 can be widened by making hardware modifications to sensor 3, to facilitate the functioning of compensation electronics 21, but at the expense of resolution. For the sensors 3 illustrated, region 16 is approximately 10° wide, centered about $A=0°$.

The present invention finds its applicability when independent spacecraft 2 angular velocity information is not available to the attitude control electronics of spacecraft 2. Thus, for example, during the early portions of the spacecraft 2 mission, an angular rate assembly containing gyroscopes could be used to provide this angular velocity information. However, such gyroscopes have a limited life because of mechanical problems, and therefore, after a certain point in the mission, the signals illustrated in FIGS. 2 and 3 are the only information provided to the attitude control electronics. Apart from region 16, where velocity information can be extracted by sampling at preselected time intervals, angular velocity information in not known.

Characteristic of commercially available astronomical body attitude sensors 3 is that, for angles A not falling within detection domain 26, amplitude y is either a maximum value M reflective of positive saturation, or a minimum value $-M$ reflective of negative saturation, depending upon whether spacecraft 2 is rotating in a positive or negative direction.

The operation of sensor 3 is illustrated in the following example, keeping in mind that compensation electronics 21 functions by commanding a torque about axis 4 opposite in polarity to signal 14. Generally, positive damping, for control laws without direct rate measurement feedback, can be derived only from the linear region 16 of the attitude sensor 3 output. A saturated sensor 3 output reduces system damping (adds negative damping). Assume system pointing performance requires that control loop gain be set high enough such that the system is conditionally stable for large angles A of 25° (or $-25°$). Therefore, if the initial condition of A is greater than $+25°$ (or less than $-25°$), the system is unstable.

Assume that spacecraft 2 is experiencing an angular velocity about axis 4 in a positive direction. Thus, FIG. 2 applies. Assume that A is $-30°$. Thus, y is M and electronics 21 is commanding a negative torque to slow down the rotation of spacecraft 2. When A reaches $-25°$, however, y suddenly becomes $-M$, provoking a positive torque, causing spacecraft 2 to speed up because it already has a positive velocity. Even if the initial velocity (at $A=-30°$) is sufficiently small, spacecraft 2 will not be captured as desired within pointing deadband 24 (where A is less than a preselected small angle, as illustrated) because with the additional positive torque provided in the domain $A=-25°$ to $A=0°$, the negative torque produced in the domain $A=0°$ to $A=25°$ is not sufficient to reverse the direction of and decrease the magnitude of spacecraft 2 velocity. This is symptomatic of control law instability and failure of spacecraft 2 to be reliably captured within deadband 24 as desired.

Figure 4:
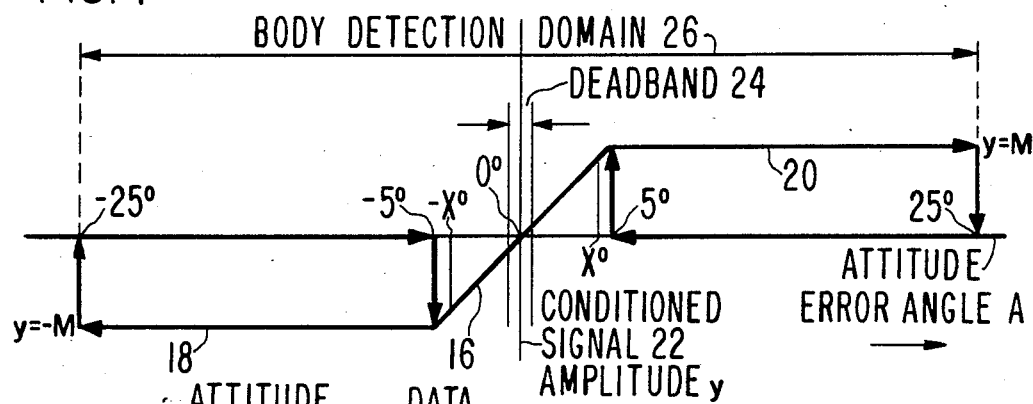
FIG. 4 shows the conditioned signal 22, corresponding to FIGS. 1 and 2, produced by the present invention.

These and other problems with the prior art, in which signal 14 is fed directly to compensation electronics 21, are remedied by the present invention, which conditions attitude signal 14 so that the signal presented to compensation electronics 21 is a conditioned signal 22 as illustrated in FIG. 4. FIG. 4 shows that conditioned signal 22 has a negative and a positive hysteresis loop. As used herein, a "hysteresis loop" is a closed area on the amplitude versus angle curve; for certain angles, the amplitude can have two different values, depending upon the direction in which angle A has been changing. Thus, for conditioned signal 22, if A is initially less than −25°, and then becomes greater than −25°, amplitude y is zero until A reaches −5°, whereupon y becomes −M. y then varies linearly through velocity informative region 16, becoming 0 for A=0°, and reaching M for A=5°. If A continues to increase past 5°, y remains equal to M until A reaches 25°, whereupon y becomes 0. If, however, A now decreases to be less than 25°, y remains at 0°, not entering the positive saturated region 20. Rather, y remains zero until A becomes as small as 5°, whereupon y becomes M. If A continues to decrease, y linearly decreases to become −M at A=−5°, then remains at −M as A continues to decrease between −5° and −25° (the negative saturated region 18). When A becomes as small as −25°, y becomes zero, where it remains for angles of A less than −25°.

This hysteresis conditioned signal 22 is superior to the attitude signal 14 produced by the prior art for the following reasons:

1. If A's most recent history is that it has been outside of detection domain 26, signal 22 first becomes non-zero only during velocity informative region 16. This eliminates the saturated signals (18 or 20) that have opposite polarity to the spacecraft 2 velocity. For example, if spacecraft 2 is rotating in a positive direction about axis 4, saturation region 18 is suppressed as A moves from outside of detection domain 26 into velocity informative region 16. Thus, the unwanted additional positive torque which would result if region 18 were encountered is desirably avoided. This avoidance of unnecessary spacecraft 2 acceleration makes it easier for electronics 21 and torquing means 25 to provide the necessary reaction torque.

2. If, however, A enters a potentially saturated zone (absolute value of A between 5° and 25°), from velocity informative region 16 and not from outside of detection domain 26, then one of the hysteresis loops allows transmission of a saturated portion (18 or 20) of the signal to electronics 21. This passage of the saturated signal (18 or 20) having the same polarity as the rotation of spacecraft 2 desirably damps spacecraft 2 velocity.

3. For angle A outside of detection domain 26, the signal 22 fed to compensation electronics 21 is forced to be zero. This desirably limits spacecraft 2 velocities in many cases, and eliminates the presentation of information to electronics 21 which is ipso facto velocity noninformative.

Figure 5:
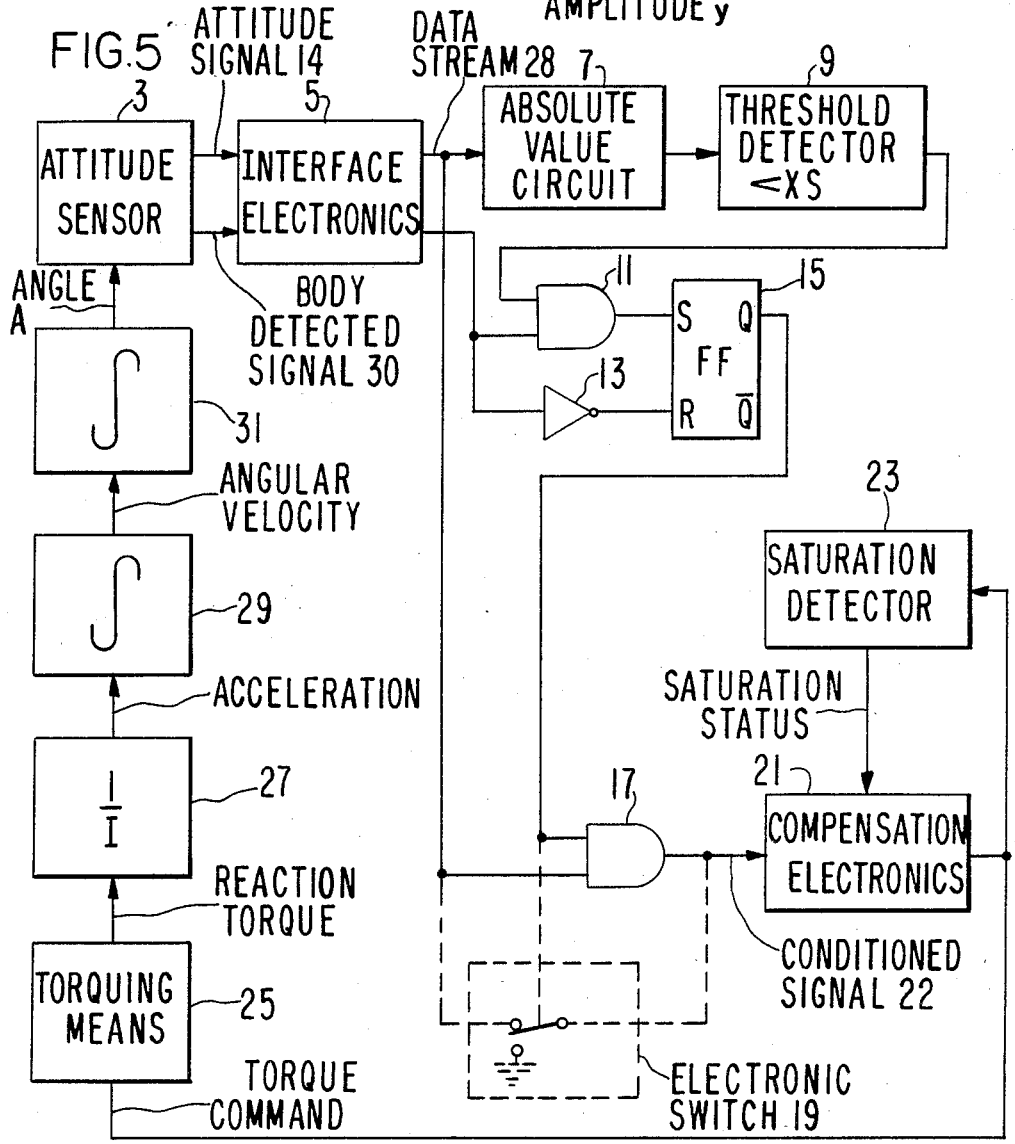
FIG. 5 is a partially functional, partially symbolic diagram illustrating the present invention.

A hardware embodiment of a suitable hysteresis conditioner for producing signal 22 is illustrated in FIG. 5. Interface electronics 5 formats and scales signal 14 for subsequent processing. If signal 14 is an analog signal, electronics 5 might convert it to digital form, i.e., for each sampling interval, which is usually on the order of a fraction of a second, a digitized signal is produced corresponding to the amplitude y of signal 14 at the beginning of, or during, that interval. The corresponding digitized output from electronics 5 is denominated data stream 28, which becomes an input to digital absolute value circuit 7, and also becomes a first input to AND gate 17.

Conventional attitude sensors 3 produce a second signal known as body detected signal 30, indicating whether or not angle A is within domain 26. Signal 30 is, if necessary, converted by electronics 5 to digital form, and is outputted by electronics 5 as a logical 1 for angles A within domain 26, and a logical 0 for angles A outside of domain 26. This binary body detected signal 30 is fed as an input to inverter 13 and as a first input to AND gate 11.

Absolute value circuit 7 is a conventional digital circuit which extracts the magnitude information from data stream 28 and passes it on to threshold detector 9, a conventional digital circuit which determines, for each sampling interval, whether the magnitude of the input data 28 is less than XS. The function of detector 9 is to determine whether the input data 28 is within or without region 16. If the answer is "yes", a logical 1 is outputted and is fed as a second input to AND gate 11. If the answer is "no", a logical zero is outputted and is fed as the second input to AND gate 11. X is an angle having a value slightly less than that of the transition angle (the angle at which region 16 transitions into region 20—in the example illustrated, 5°), and S is the slope of signal 14 within region 16. In the example illustrated, S is equal to 1. The reason for selecting X to be slightly less than the transition angle is to provide a margin of safety to ensure that detector 9 does not erroneously report that data 28 is within region 16 when in fact it is within region 18 or 20.

The output of AND gate 11 is fed to the set (S) input of flip-flop 15. The output of inverter 13 is fed to the reset (R) input of flip-flop 15. The Q output of flip-flop 15 is fed as a second input to AND gate 17, the output of which conveys conditioned signal 22 as an input to compensation electronics 21, a conventional control loop compensation circuit, such as a lead/lag circuit.

It will be appreciated that the set input to flip-flop 15 is a logical 1 when the amplitude of signal 14 falls within velocity informative region 16 (as slightly shrunk because of the selection of X rather than the transmission angle for the threshold). This logical 1 forces the Q output of flip-flop 15 to also be a logical 1, commanding AND gate 17 to pass data stream 28 to electronics 21. The Q output of flip-flop 15 remains a logical 1 until input R of flip-flop 15 becomes a logical 1, forcing the Q output of flip-flop 15 to be a logical 0, hence inhibiting the flow of data stream 28 to electronics 21. Input R is a logical 1 only when body detected signal 30 is a logical 0, i.e., only when angle A is outside of domain 26.

As an alternative embodiment, when sensor 3 produces a signal 14 which is analog, signal 14 is retained in analog form by electronics 5. Absolute value circuit 7 and threshold detector 9 then are analog rather than digital circuits. In this case, as shown by dotted lines in FIG. 5, AND gate 17 is replaced by switch 19 which is actuated by a logical 1 from the Q output of flip-flop 15, causing switch 19 to close, thus passing the analog data 28 from electronics 5 through to electronics 21.

Electronics 21 sends a torque command to torquing means 25 to damp the velocity of spacecraft 2 by means of producing a torque of opposite polarity to that of input signal 22. When signal 22 is within velocity informative region 16, the velocity information is utilized by integration means within electronics 21 to provide the proper torque command. The torque command output of electronics 21 is also fed to saturation detector 23, which determines whether torquing means 25 is being commanded to deliver more torque than it is capable of delivering. All torquing means 25 have practical limits, such as maximum torque, storage momentum, etc. Proper scaling of commanded torque with respect to the actual available reaction torque enhances control loop stability. If torquing means 25 is being commanded to deliver more torque than it is capable of delivering, saturation detector 23 feeds a saturation status signal back to electronics 21, instructing the latter to scale down its gain so that torquing means 25 will not be saturated. This is to prevent the control loop from being over-integrated. Over-integration of the control loop reduces control loop damping, and if not prevented, the torque command may remain in the wrong polarity even after angle A has changed sign. Saturation detector 23 thus decreases control loop phase margin.

The actual configuration of electronics 21 depends upon the configuration of spacecraft 2 and the control requirements. Electronics 21 can be a simple lead-lag compensation network deriving spacecraft 2 velocities and dampings. Torquing means 25 can be a momentum wheel, a set of gas operated thrusters, an interactive magnetic dipole arrangement, or some other device or combination of devices. Torquing means 25 produces a reaction torque about axis 4. On FIG. 5, box 27 is a symbolic box indicating that dividing the reaction torque by the moment of inertia I of spacecraft 2 yields the angular acceleration $d^2A/dt^2$ about axis 4. Box 29 is a symbolic box indicating that integration of the acceleration yields angular velocity $dA/dt$. Box 31 is another symbolic box indicating that integration of the angular velocity yields angle A sensed by sensor 3.

As an alternative to the hardware depicted in FIG. 5, the hysteresis conditioner of the present invention can be implemented by means of a computer program. Such a software program has been written in the FORTRAN language as follows:

```
*IF (ESEP.LE.0) THEN
  IJK=0
END IF
*IF   (ESEP.GT.0.AND.ABS(PESD).LE.XS)
THEN
  IJK=1
END IF
*IF (IJK.EQ.0) THEN
  PESD=0
END IF
```

In the above program, ESEP corresponds to body detected signal 30; it is a 1 if body 6 is being detected by sensor 3, and a 0 if body 6 is not being detected by sensor 3. IJK is a status bit corresponding to the Q output of flip-flop 15. PESD is the amplitude y of signal 14.

Figure 6:
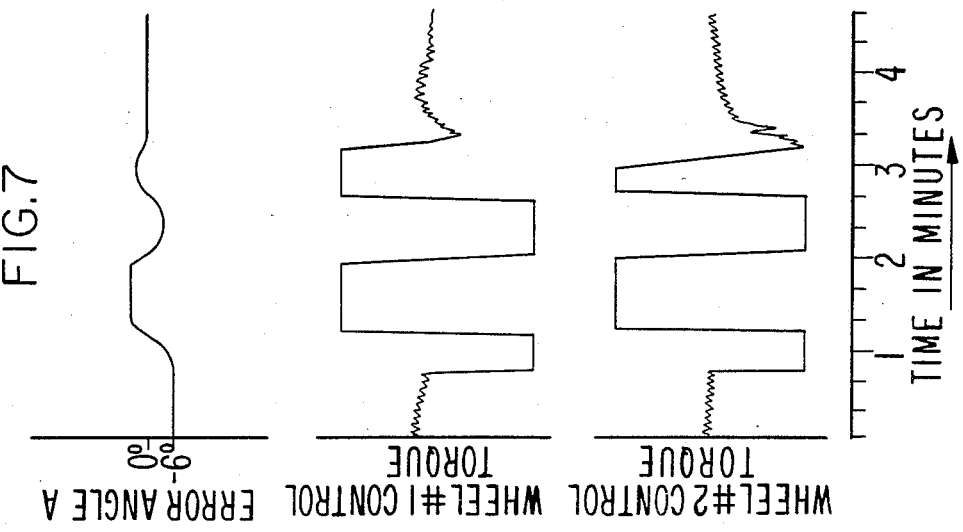
FIG. 6 is a set of three curves showing instability of spacecraft 2 when the present invention is not used, for an initial attitude error angle A of 6°.
Figure 7:
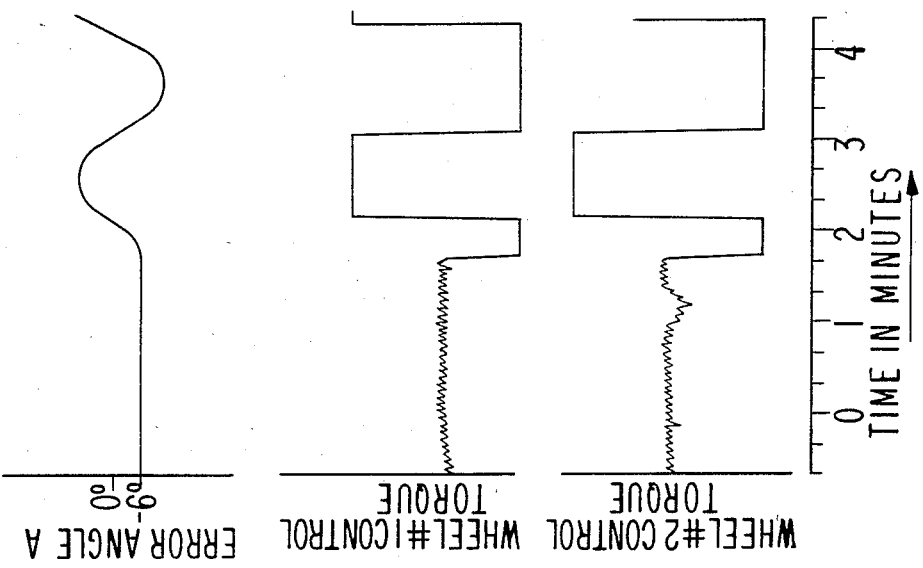
FIG. 7 is a set of three curves showing that the spacecraft 2 whose performance is depicted in FIG. 6 is stabilized when the present invention is utilized.
Figure 8:
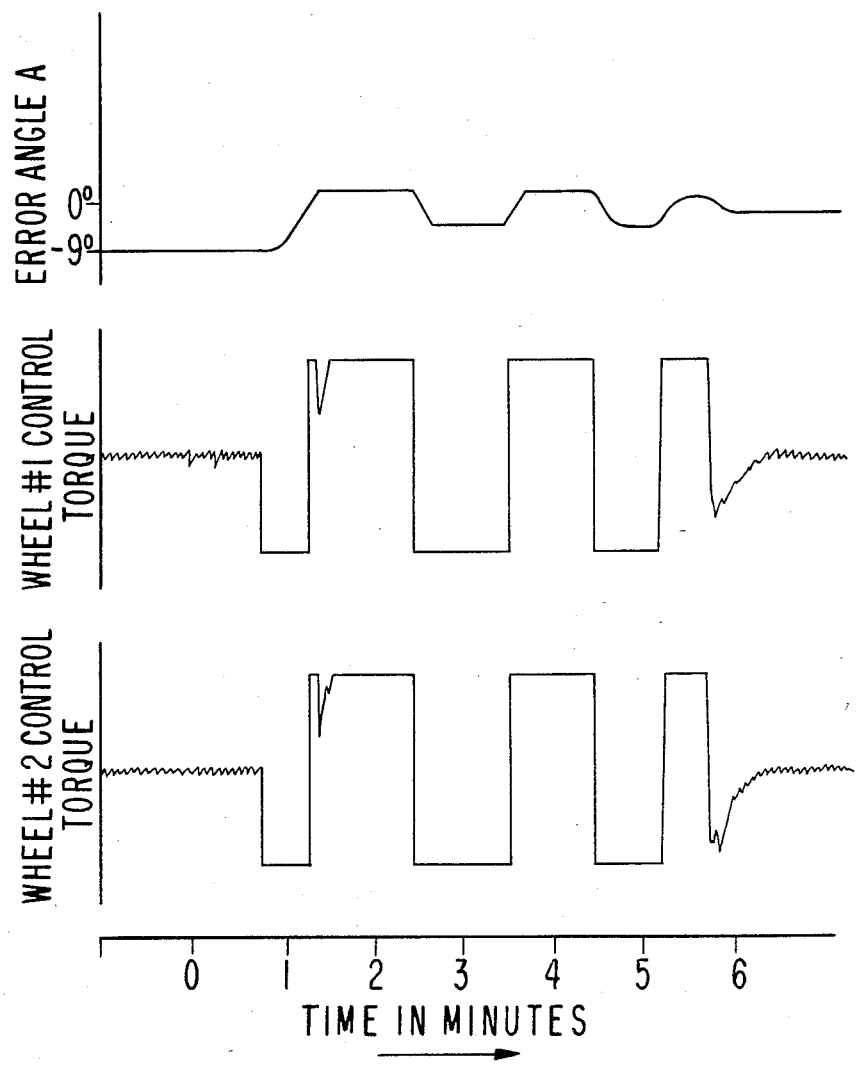
FIG. 8 is a set of three curves showing that the spacecraft 2 of FIGS. 6 and 7 remains stabilized even with an initial attitude error angle A of 9°.

FIGS. 6, 7, and 8 present observed data from a test apparatus consisting of a gimballed servo test table mechanically driven by a computer which simulated the spacecraft 2 motion and the earth. Sensor 3 was the same sensor that provided the data shown in FIGS. 2 and 3. In each case, the sensing axis 4 was the pitch axis. Torquing means 25 consisted of two separate momentum wheels, each canted about the pitch axis by 2.25°. The initial angular velocity in each Figure was identical and was very low. For FIG. 6, the invention was not used and the initial offset angle A was 6°. For this test, the gain was set to cause a conditional stable system at 5°. It is seen that the spacecraft 2 became unstable and was not captured within the deadband 24.

In FIG. 7 the initial offset angle A was the same 6°, but the hysteresis conditioner of the present invention was used. Angle X of the hysteresis conditioner was set at 3°. It is seen that spacecraft 2 was successfully captured in relatively short order.

In FIG. 8 the invention was used and the offset angle A was increased to 9°. Once again, spacecraft 2 was successfully captured.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. Apparatus for stabilizing the attitude of a spacecraft with respect to an astronomical body, comprising:
   mounted on the spacecraft, means for sensing the attitude error angle, orthogonal to a sensing axis, between a line fixedly associated with the spacecraft and a line connecting the spacecraft with the astronomical body, said sensing means being capable of detecting the presence of the astronomical body within a detection angular domain that is less than 360° and producing an attitude signal representative of said angle;
   coupled to the sensing means, means for conditioning the attitude signal to enhance spacecraft stability, said conditioning means comprising a hysteresis loop and producing a conditioned signal; and
   mounted on the spacecraft and coupled to the conditioning means, means for forcing said error angle towards zero, said forcing means having as an input of said conditioned signal; wherein
   for error angles outside of the detection angular domain, the amplitude of the conditioned signal is suppressed, to inhibit the actuation of the forcing means.

2. Apparatus of claim 1 wherein the forcing means comprises:
   compensation electronics having as an input the conditioned signal;
   coupled to the compensation electronics, means for torquing the spacecraft about said sensing axis; and
   coupled to the compensation electronics and to the torquing means, means for inhibiting saturation of the torquing means.

3. Apparatus of claim 1 wherein the spacecraft is three-axis stabilized about three orthogonal axes, one of which is the sensing axis.

4. Apparatus of claim 1 in which the spacecraft is the despun platform portion of a spin stabilized space vehicle further comprising a spinning portion.

5. Apparatus of claim 1 wherein the conditioning means comprises a computer program.

6. Apparatus for stabilizing the attitude of a spacecraft with respect to an astronomical body, comprising:
   mounted on the spacecraft, means for sensing the attitude error angle, orthogonal to a sensing axis, between a line fixedly associated with the spacecraft and a line connecting the spacecraft with the astronomical body, said sensing means producing an attitude signal representative of said angle;
   coupled to the sensing means, means for conditioning the attitude signal to enhance spacecraft stability, said conditioning means comprising a hysteresis loop and producing a conditioned signal; and
   mounted on the spacecraft and coupled to the conditioning means, means for forcing said error angle towards zero, said forcing means having as an input said conditioned signal;
   wherein the conditioning means comprises an absolute value circuit coupled to the sensing means, a threshold detector coupled to the absolute value circuit, and a flip-flop coupled via gates to the threshold detector and to the forcing means.

7. Apparatus for stabilizing the attitude of a spacecraft with respect to an astronomical body, comprising:
mounted on the spacecraft, means for sensing the attitude error angle, orthogonal to a sensing axis, between a line fixedly associated with the spacecraft and a line connecting the spacecraft with the astronomical body, said sensing means producing an attitude signal representative of said angle;
coupled to the sensing means, means for conditioning the attitude signal to enhance spacecraft stability, said conditioning means comprising a hysteresis loop and producing a conditioned signal; and
mounted on the spacecraft and coupled to the conditioning means, means for forcing said error angle towards zero, said forcing means having as an input said conditioned signal;
wherein the conditioned signal comprises:
a first hysteresis loop within a first, negative error angle region that is part of said detection domain;
a second hysteresis loop within a second, positive error angle region that is part of said detection domain; and
a linear sloping portion within a third error angle region intermediate said first and second regions.

8. Apparatus of claim 7 wherein the conditioning means further comprises means for permitting information from said sensing means to be passed to said forcing means when said error angle falls within a preselected spacecraft-velocity-informative subregion of said third region.

9. Apparatus for stabilizing the attitude of a spacecraft with respect to an astronomical body, comprising:
mounted on the spacecraft, means for sensing the attitude error angle, orthogonal to a sensing axis, between a line fixedly associated with the spacecraft and a line connecting the spacecraft with the body;
wherein the sensing means produces an attitude signal representative of said error angle, said attitude signal having a detection angular domain within which the sensing means is capable of detecting the presence of the body;
said detection angular domain comprising a negative saturated region corresponding to negative error angles, a positive saturated region corresponding to positive error angles, and a sloping region connecting the negative and positive saturated regions;
said apparatus further comprising:
coupled to the sensing means, means for conditioning the attitude signal to enhance spacecraft stability, said conditioning means comprising a hysteresis loop and producing a conditioned signal; and
mounted on the spacecraft and coupled to the conditioning means, means for forcing the error angle towards zero, said forcing means having as an input said conditioned signal; wherein
the conditioning means inhibits transmission from the sensing means to the forcing means of that saturated region having opposite polarity with respect to the polarity of the angular velocity of the spacecraft about the sensing axis.

10. Apparatus for stabilizing the attitude of a spacecraft with respect to an astronomical body, comprising:
mounted on the spacecraft, means for sensing the attitude error angle, orthogonal to a sensing axis, between a line fixedly associated with the spacecraft and a line connecting the spacecraft with the body;
wherein the sensing means produces an attitude signal representative of said error angle, said attitude signal having a detection angular domain within which the sensing means is capable of detecting the presence of the body;
said detection angular domain comprising a negative saturated region corresponding to negative error angles, a positive saturated region corresponding to positive error angles, and a sloping region connecting the negative and positive saturated regions;
said apparatus further comprising:
coupled to the sensing means, means for conditioning the attitude signal to enhance spacecraft stability, said conditioning means comprising a hysteresis loop and producing a conditioned signal; and
mounted on the spacecraft and coupled to the conditioning means, means for forcing the error angle towards zero, said forcing means having as an input said conditioned signal; wherein
the conditioning means permits transmission from the sensing means to the forcing means of that saturated region which has the same polarity as the polarity of the angular velocity of the spacecraft about the sensing axis.

* * * * *